Nov. 27, 1928.  1,693,375
R. FERRERO
DIRIGIBLE HEADLIGHT
Filed Jan. 12, 1928
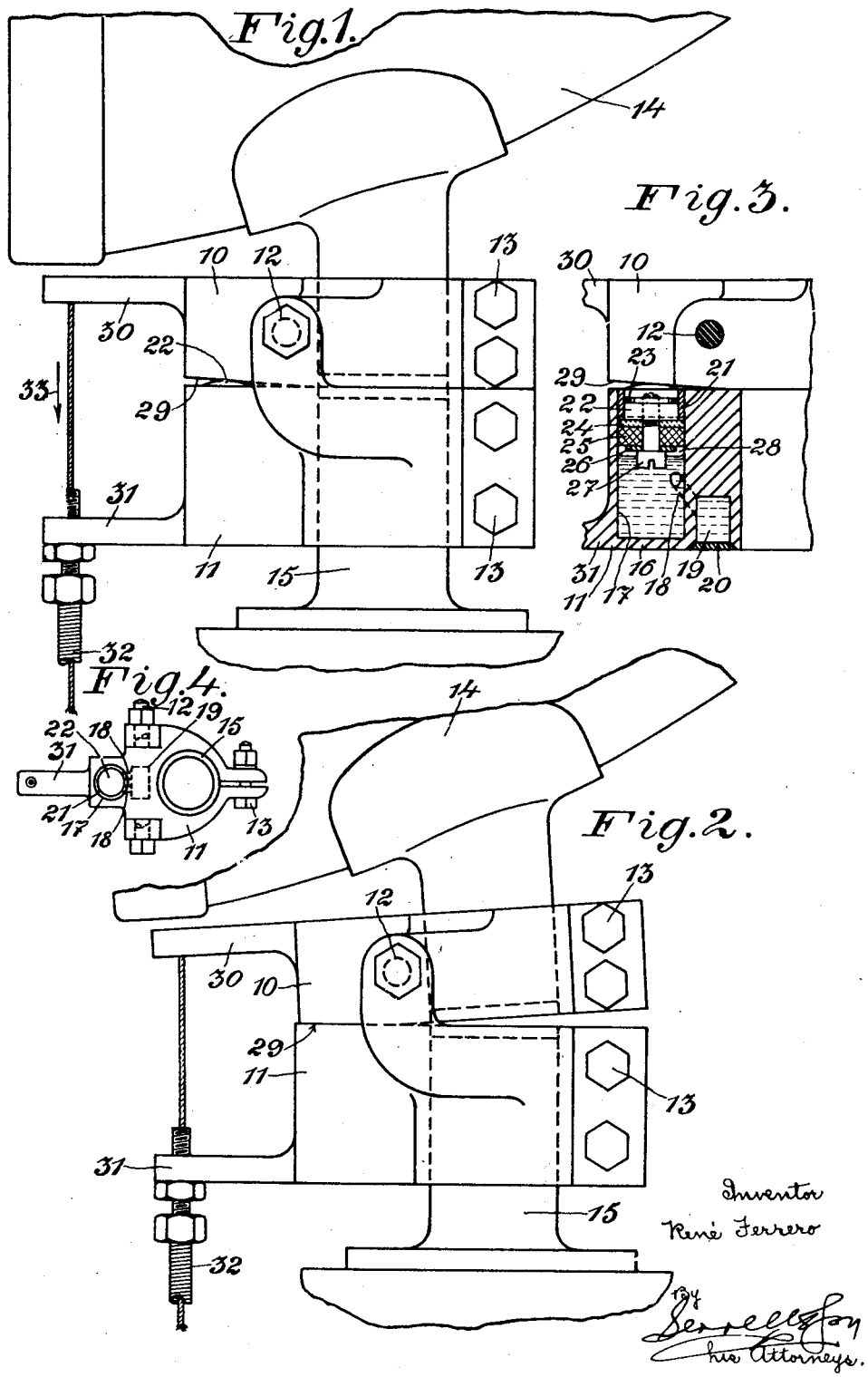

Patented Nov. 27, 1928.

1,693,375

UNITED STATES PATENT OFFICE.

RENÉ FERRERO, OF GENEVA, SWITZERLAND.

DIRIGIBLE HEADLIGHT.

Application filed January 12, 1928. Serial No 246,851, and in Germany February 10, 1927.

The present invention refers to articulated headlight supports for motor and other vehicles, in which supporting members can move relatively to a limited extent.

It is characterized in that such motion takes place against the action of a piston working in a cylinder by means of which piston air is compressed. In this manner the use of springs for preventing the searchlights from moving from their position of rest is avoided, which springs have various drawbacks.

Said springs have to be fairly strong so that they cannot be housed easily within the bearing parts. Thus the amount of space required for such bearings is increased and their mounting on vehicles is often difficult, also the oscillations of the springs cause the headlights to move, thus producing wear of the bearings and an unpleasant noise. Also, in time the springs lose their elasticity and the bearing portions can no longer be maintained immovable with respect to one another.

The accompanying drawing illustrates by way of example an embodiment of the invention.

Figure 1 shows an elevation of the bearing in its normal position.

Figure 2 is a view of the bearing when it is actuated.

Figure 3 is a vertical longitudinal part section.

Figure 4 is a plan of the part 11 on a smaller scale.

The bearing consists of two members 10 and 11 which are jointed together at 12. Each portion 10 and 11 is provided with clamping screws 13 by which the headlight 14 is rigidly held in the portion 10, and the portion 11 can be rigidly secured to a mounting 15 on the vehicle.

In the body portion 16 of the part 11 a cylinder 17 is bored, which cylinder is connected by means of two small channels 18 with another chamber 19. This chamber is entirely closed by a welded or soldered cover 20.

In the upper portion of the cylinder there is a ring 21 which is driven in and may be of steel. In this slides a small piston 22 provided with a piston ring 23, and the upper portion of the piston is rounded, and on its rear surface a leather disk 24 and a felt disk 25 are rigidly secured by means of a small metal disc 26 and a screw 27.

The chamber 19 and the cylinder 17 are filled with a liquid as, for example, oil, so that between the piston and the surface of the liquid there is only a small air cushion 28.

The surface 29 of the member 10 lying above the piston 22 is slightly inclined as will be seen from the drawing in order to allow a small contrary motion of the member 10, 11 about the axis 12.

Each member 10 and 11 is provided with an arm 30 or 31. To the arm 30 the end of a Bowden cable 32 is secured the sheath of which is fastened to the arm 31.

In practice the assembly of the bearing will be so effected that the cylinder 17 and the chamber 19 are carefully filled with liquid as for example oil to such an extent that under the ring 21 and above the liquid a free space is present in which the leather and felt disks 24 and 25 of the piston 22 exactly fit, after which they are driven in by the ring 21 so that there is still between the felt disk and the liquid a small cushion 28 of compressed air.

The method of actuating the bearing is as follows:

When the parts are in the position shown in Figure 1 and the Bowden cable 32 is moved in the direction of the arrow 33 then the members 10 and 11 assume the position shown in Figure 2, the piston 22 being forced by the surface 29 into the cylinder 17.

By this means the air cushion 28 is compressed so that as soon as the pull on the cable 32 ceases the piston is driven back, whereby these members are again brought back to their original position.

Since the cylinder 17 and the chamber 19 are filled with oil and as the vehicle vibrates, this liquid comes into contact with the felt disk 25, this is, therefore, always saturated with oil, whereby the tightness of the piston is further increased.

On account of the rounded form of the surface of the piston the pressure of the surface 29 remains always practically axial on the piston so that it works without strain.

When the members 10 and 11 are in the position shown in Figure 1 the headlight 14 is directed straight. The slight opposite motion of the parts into the position of Figure 2 suffices to incline the beam of rays so that the dazzling effect of the headlight on pedestrians or on persons in vehicles is avoided.

The members 10 and 11 may be constructed of aluminum.

Since the piston 22 is provided with a piston ring 23 and since further the felt and leather disks 24, 25 are always saturated with oil there is no danger of the compressed air contained in the cylinder 17 escaping even in use.

What I claim is:

1. In an articulated headlight support for motor or other vehicles the combination, with supporting members which can move relatively to a limited extent, of a piston working in a cylinder against which said motion has to take place and by means of which air is compressed, the cylinder being almost filled in with liquid so as to present a small air cushion between the rear surface of the piston and the liquid.

2. In an articulated headlight support for motor or other vehicles the combination, with supporting members which can move relatively to a limited extent, of a piston working in a cylinder against which said motion has to take place and by means of which air is compressed, the cylinder being connected with an additional closed chamber increasing the volume of the liquid.

3. In a headlight dipping mechanism, a two member hinged bracket, one member being mounted on a support and the other adapted to carry a headlight, there being a bore formed in one of the said members, and a cylinder and piston placed in the said bore to compress air therein, the piston acting against a part of the other bracket member for normally maintaining the same and the headlight in an initial position and being movable to permit the said other bracket member to swing slightly to dip the headlight.

4. In a headlight dipping mechanism, a two member hinged bracket, means for mounting one member of the bracket on a support, means for securing a headlight to the other member of the bracket, there being a bore provided in one of the members of the bracket, and a cylinder and piston placed in the said bore to compress air therein, the piston acting against a part of the other bracket member for normally maintaining the same and the headlight in an initial position and being movable to permit the said other bracket member to swing slightly to dip the headlight.

5. In a headlight dipping mechanism, a two part hinged bracket, means for mounting one of the parts of the bracket on a support, means for connecting a headlight in the other member of the bracket, there being a bore in one of the members of the bracket, the said bore having a quantity of liquid therein, and a cylinder and piston placed in the said bore to compress air between the same and the liquid in the bore, the piston acting against a part of the other member of the bracket for normally maintaining the same and the headlight in an initial position and being movable to permit the said other member of the bracket to swing slightly to thereby dip the headlight.

In testimony whereof I have signed my name to this specification.

RENÉ FERRERO.